United States Patent
Ibrahim et al.

(10) Patent No.: US 8,081,929 B2
(45) Date of Patent: Dec. 20, 2011

(54) METHOD AND SYSTEM FOR OPTIMAL FREQUENCY PLANNING FOR AN INTEGRATED COMMUNICATION SYSTEM WITH MULTIPLE RECEIVERS

(75) Inventors: Brima Ibrahim, Aliso Viejo, CA (US); Alireza Zolfaghari, Irvine, CA (US); Steven Hall, Olivenhain, CA (US); Kambiz Shoarinejad, Los Angeles, CA (US); Bojko Marholev, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 791 days.

(21) Appl. No.: 12/133,637

(22) Filed: Jun. 5, 2008

(65) Prior Publication Data

US 2009/0302966 A1    Dec. 10, 2009

(51) Int. Cl.
*H04B 1/00* (2006.01)
*H04B 15/00* (2006.01)
*H04B 17/00* (2006.01)
*H04B 1/10* (2006.01)

(52) U.S. Cl. ............... 455/67.11; 455/63.1; 455/67.13; 455/295; 455/296

(58) Field of Classification Search .............. 455/63.1, 455/67.13, 283, 293, 295, 296, 340, 67.11, 455/317
See application file for complete search history.

(56) References Cited

U.S. PATENT DOCUMENTS

| | | | | |
|---|---|---|---|---|
| 4,709,406 A * | 11/1987 | Omoto | ................. | 455/208 |
| 6,606,484 B1 * | 8/2003 | Faulkner | ............... | 455/131 |
| 6,968,173 B2 * | 11/2005 | Cowley | ................. | 455/323 |
| 7,043,208 B2 * | 5/2006 | Nigra | ................... | 455/78 |
| 7,239,358 B1 * | 7/2007 | Mayer | ................... | 348/731 |
| 7,515,895 B2 * | 4/2009 | Vorenkamp et al. | .......... | 455/307 |
| 7,630,686 B2 * | 12/2009 | Fukutani et al. | ............ | 455/63.1 |
| 7,904,024 B2 * | 3/2011 | Dessert et al. | .............. | 455/63.1 |
| 2005/0266818 A1 * | 12/2005 | Johnson et al. | .............. | 455/260 |
| 2006/0281429 A1 * | 12/2006 | Kishi et al. | ................ | 455/313 |
| 2008/0039045 A1 * | 2/2008 | Filipovic et al. | ............. | 455/295 |
| 2008/0096508 A1 * | 4/2008 | Luff | ........................ | 455/209 |
| 2008/0233894 A1 * | 9/2008 | Aparin | ..................... | 455/78 |
| 2009/0186587 A1 * | 7/2009 | Sobchak et al. | ............ | 455/196.1 |

* cited by examiner

*Primary Examiner* — Simon Nguyen
(74) *Attorney, Agent, or Firm* — McAndrews, Held & Malloy, Ltd.

(57) ABSTRACT

Methods and systems for optimal frequency planning for an integrated communication system with multiple receivers may include adjusting a center frequency of a low IF signal to reduce interference by a second order interference signal. The center frequency may be adjusted to avoid high power portions of the second order interference signal. The interference level corresponding to a center frequency may be determined by, for example, a SNR of the low IF signal, or by determining a BER for the low IF signal. The center frequency of the low IF signal may be dynamically adjusted to keep second order interference level at an acceptable level. Adjusting the center frequency of the low IF signal may also comprise keeping the low IF signal from being blocked by a DC component of the second order interference signal.

21 Claims, 6 Drawing Sheets

METHOD AND SYSTEM FOR OPTIMAL FREQUENCY PLANNING FOR AN INTEGRATED COMMUNICATION SYSTEM WITH MULTIPLE RECEIVERS

CROSS-REFERENCE TO RELATED APPLICATIONS/INCORPORATION BY REFERENCE

[Not Applicable.]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to processing signals. More specifically, certain embodiments of the invention relate to a method and system for optimal frequency planning for an integrated communication system with multiple receivers.

BACKGROUND OF THE INVENTION

In radio frequency (RF) applications, an RF receiver or a receiver portion of an RF transceiver may be required to tolerate the presence of large interfering signals lying within the passband that corresponds to a communication channel of interest. These interfering signals may have originated from users in adjacent channels and/or from transmission sources which may be relatively far removed in frequency from the channel of interest but whose large transmission power may still cause significant interference problems. These interfering signals may be referred to as blockers, and their relative frequency and/or detected power to that of the desired signal may vary based on transmission scheme and/or operational conditions. The effect of interfering signals in the channel of interest may result in, for example, bit error rate (BER) degradation in digital RF systems and signal-to-noise ratio (SNR) degradation in analog RF systems.

However, the ability to provide an interference-tolerant design may be difficult to accomplish as second-order distortion effects are increasingly becoming a limitation in circuitry utilized by the wireless receivers. For example, mixers and/or other circuitry which may be utilized to downconvert a channel of interest to a zero intermediate frequency (IF) or to a low IF may generate, as a result of second-order nonlinearities, spectral components from blocker signals which may be at or near DC.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for optimal frequency planning for an integrated communication system with multiple receivers, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for optimal frequency planning for an integrated communication system with multiple receivers. Aspects of the invention may comprise down-converting a RF signal to a low IF signal with a center frequency that has been determined to reduce interference by a second order interference signal. The center frequency of the low IF signal may be determined based upon a type of modulation envelope for the second order interference signal, where the modulation envelope may comprise substantially constant power spectrum or a non-constant power spectrum. The type of modulation envelope may vary with, for example, different types of wireless transmission systems. The power spectrum for the modulation envelopes may be determined, for example, via simulation for different types of wireless transmission systems.

The center frequency of the low IF signal may be optimized, for example, by iteratively adjusting the center frequency. For example, the center frequency may be set to a certain frequency, and whether the interference level may be low enough may be determined by, for example, measuring a signal to noise ratio of the low IF signal, or by determining a bit error rate for the low IF signal. Accordingly, the center frequency of the low IF signal may be dynamically adjusted to keep the level of the second order interference at an acceptable level. Adjusting the center frequency of the low IF signal may also comprise keeping the low IF signal from being blocked by a DC component of the second order interference signal.

Figure 1:
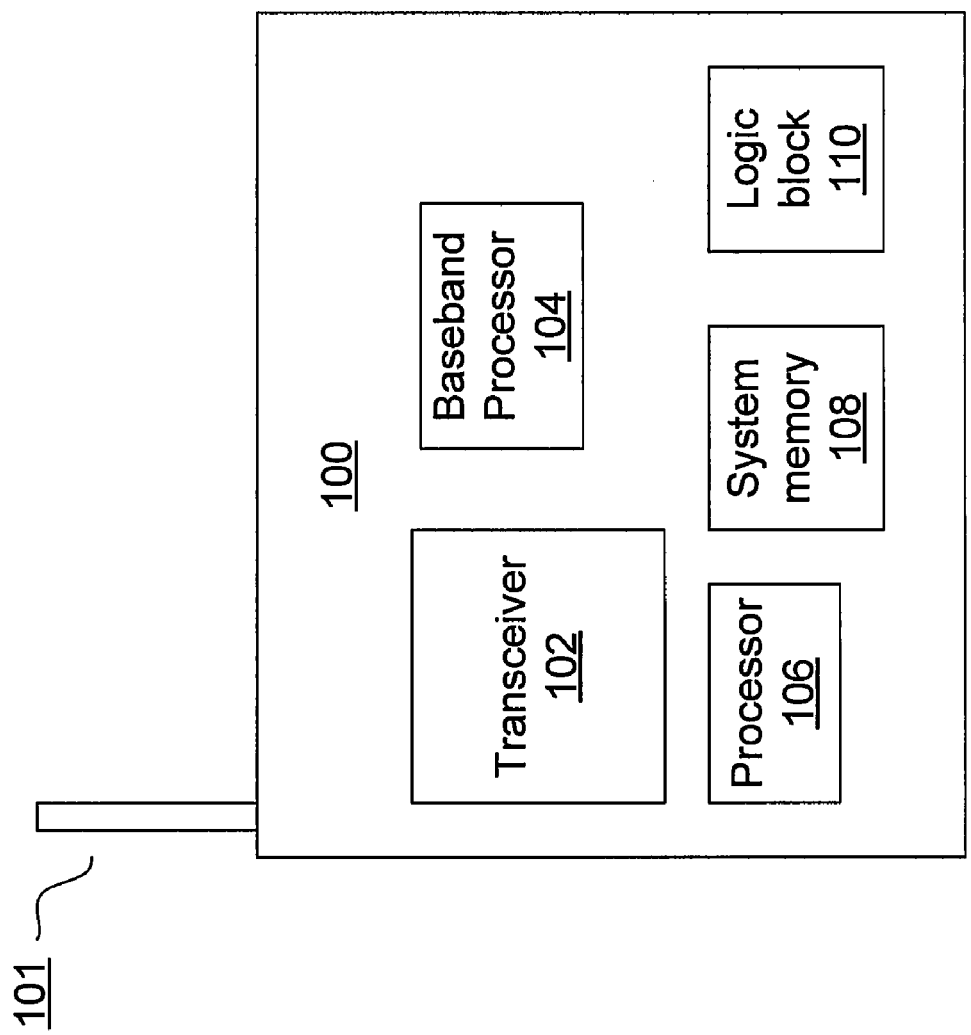
FIG. 1 is a block diagram of an exemplary wireless system, which may be utilized in connection with an embodiment of the invention.

FIG. 1 is a block diagram of an exemplary wireless system, which may be utilized in connection with an embodiment of the invention. Referring to FIG. 1, the wireless system 100 may comprise an antenna 101, a transceiver 102, a baseband processor 104, a processor 106, a system memory 108, and a logic block 110. The antenna 101 may be used for reception and/or transmission of RF signals. The transceiver 102 may comprise suitable logic, circuitry, and/or code that may be operable to modulate and upconvert baseband signals to RF signals for transmission by one or more antennas, which may be represented generically by the antenna 101.

The transceiver 102 may also be operable to downconvert and demodulate received RF signals to baseband signals. The RF signals may be received by one or more antennas, which may be represented generically by the antenna 101. Different wireless systems may use different antennas for transmission and reception. The transceiver 102 may be operable to execute other functions, for example, filtering the baseband and/or RF signals, and/or amplifying the baseband and/or RF signals.

The baseband processor 104 may comprise suitable logic, circuitry, and/or code that may be operable to process baseband signals for transmission via the transceiver 102 and/or the baseband signals received from the transceiver 102. The processor 106 may be any suitable processor or controller such as a CPU or DSP, or any type of integrated circuit processor. The processor 106 may comprise suitable logic, circuitry, and/or code that may be operable to control the operations of the transceiver 102 and/or the baseband processor 104. For example, the processor 106 may be utilized to update and/or modify programmable parameters and/or values in a plurality of components, devices, and/or processing elements in the transceiver 102 and/or the baseband processor 104.

Control and/or data information, which may comprise the programmable parameters, may be transferred from other portions of the wireless system 100, which may not be shown, to the processor 106. Similarly, the processor 106 may be operable to transfer control and/or data information, which may include the programmable parameters, to other portions of the wireless system 100, which may not be shown, which may be part of the wireless system 100.

The processor 106 may utilize the received control and/or data information, which may comprise the programmable parameters, to determine an operating mode of the transceiver 102. For example, the processor 106 may be utilized to select a specific frequency for a local oscillator, a specific gain for a variable gain amplifier, configure the local oscillator and/or configure the variable gain amplifier for operation in accordance with various embodiments of the invention. Moreover, the specific frequency selected and/or parameters needed to calculate the specific frequency, and/or the specific gain value and/or the parameters, which may be utilized to calculate the specific gain, may be stored in the system memory 108 via the processor 106, for example. The information stored in the system memory 108 may be transferred to the transceiver 102 from the system memory 108 via the processor 106. The system memory 108 may comprise suitable logic, circuitry, and/or code that may be operable to store a plurality of control and/or data information, including parameters needed to calculate frequencies and/or gain, and/or the frequency value and/or gain value.

The logic block 110 may comprise suitable logic, circuitry, and/or code that may enable controlling of various functionalities of the wireless system 100. For example, the logic block 110 may comprise one or more state machines that may generate signals to control the transceiver 102 and/or the baseband processor 104. The logic block 110 may also comprise registers that may hold data for controlling, for example, the transceiver 102 and/or the baseband processor 104. The logic block 110 may also generate and/or store status information that may be read by, for example, the processor 106. Amplifier gains and/or filtering characteristics, for example, may be controlled by the logic block 110.

Figure 2:
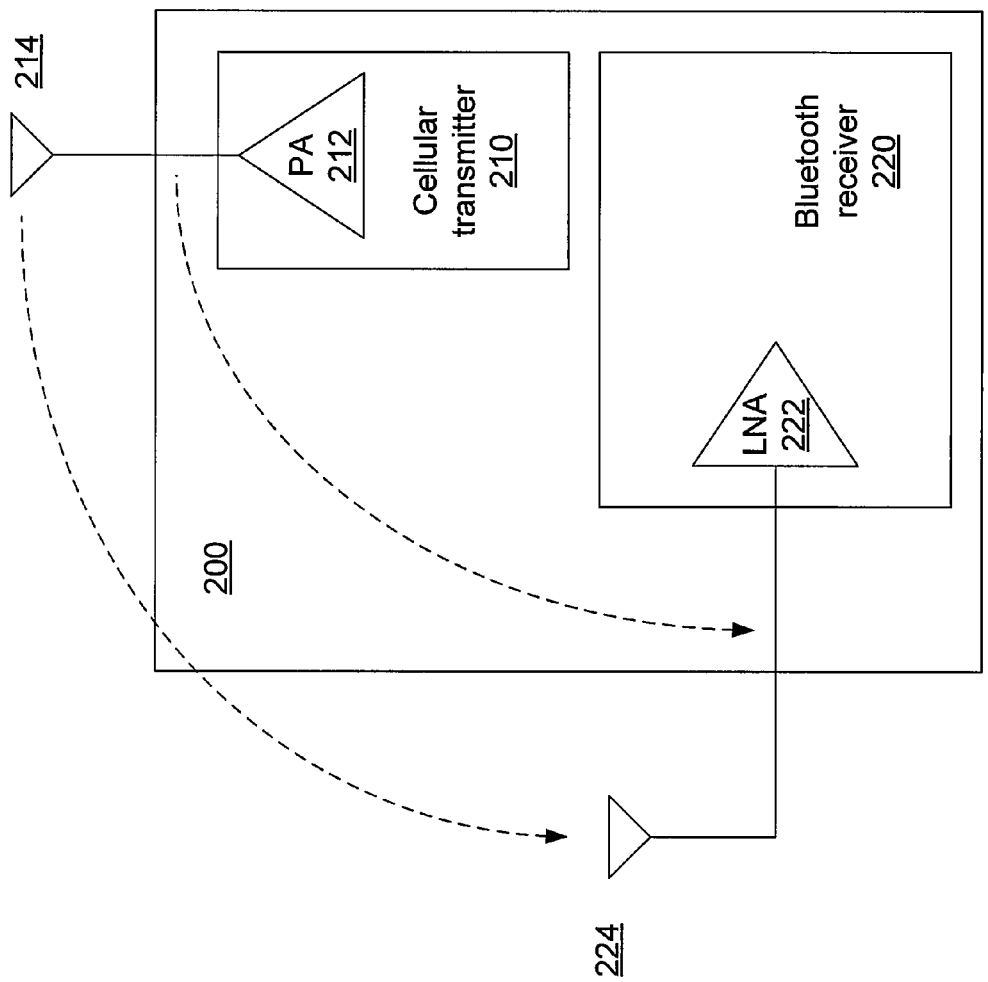
FIG. 2 is a block diagram illustrating exemplary interference coupling paths for collocated transceivers, in accordance with an embodiment of the invention.

FIG. 2 is a block diagram illustrating exemplary interference coupling paths for collocated transceivers, in accordance with an embodiment of the invention. Referring to FIG. 2, there is shown a wireless system 200 that comprises, for example, a cellular transmitter 210 and a Bluetooth receiver 220. The cellular transmitter 210 may comprise, for example, a power amplifier 212. The power amplifier may comprise suitable circuitry that may enable providing gain for RF signals to be transmitted by, for example, the antenna 214. The Bluetooth receiver 220 may comprise, for example, a low noise amplifier 222. The low noise amplifier 222 may comprise suitable circuitry that may enable amplification of RF signals received, for example, via the antenna 224.

In operation, a receiver such as the Bluetooth receiver 220 may receive RF signals. The received RF signals may comprise desired RF signals as well as noise signals. If source of the noise signal is close to the Bluetooth receiver 220, the noise level may be very large compared to the desired RF signals that are received by the Bluetooth receiver 220. Accordingly, if frequencies of the noise signals are close enough to frequencies of the desired RF signals, the desired RF signals may not be able to be demodulated to recover useful information. However, appropriate use of frequency duplex division (FDD) and/or time duplex division (TDD) for transmission by the various wireless devices, and signal strength control may alleviate direct interference.

There may also be interference to a received signal other than by direct interference. For example, there may be second order distortion signals that may be a result of undesired coupling of signals from a nearby transmitter such as, for example, the collocated cellular transmitter 210. Second order distortion signals may be a result of, for example, device non-linearity and/or RF-LO leakage during the down-conversion process. Although the transmission frequencies used by the cellular transmitter 210 may be different than the frequencies of the desired RF signals received by the Bluetooth receiver 220, there may be interference when the received signals are down-converted to lower frequencies. Circuitry for down-converting RF signals is described in more detail with respect to FIG. 3.

Down-conversion of desired RF signals may result in a low intermediate frequency (LIF) signal. However, the desired Bluetooth LIF signal in the Bluetooth receiver 220 may also be blocked or interfered with by unwanted signals, such as, for example, second order distortion signals from other RF sources. One of the RF sources that may provide second order distortion signals may be, for example, RF signals from the cellular transmitter 210. A receiver such as the Bluetooth receiver 220 may be driven into non-linearity by the second order distortion signals. The non-linearity due to the second order distortion signals may be alleviated, for example, by adjusting the frequency of the LIF signal to avoid the frequency spectrums where the second order distortion signals are relatively strong. Interfering with desired LIF signals by second order distortion signals is described in more detail with respect to FIGS. 4 and 5.

Figure 3:
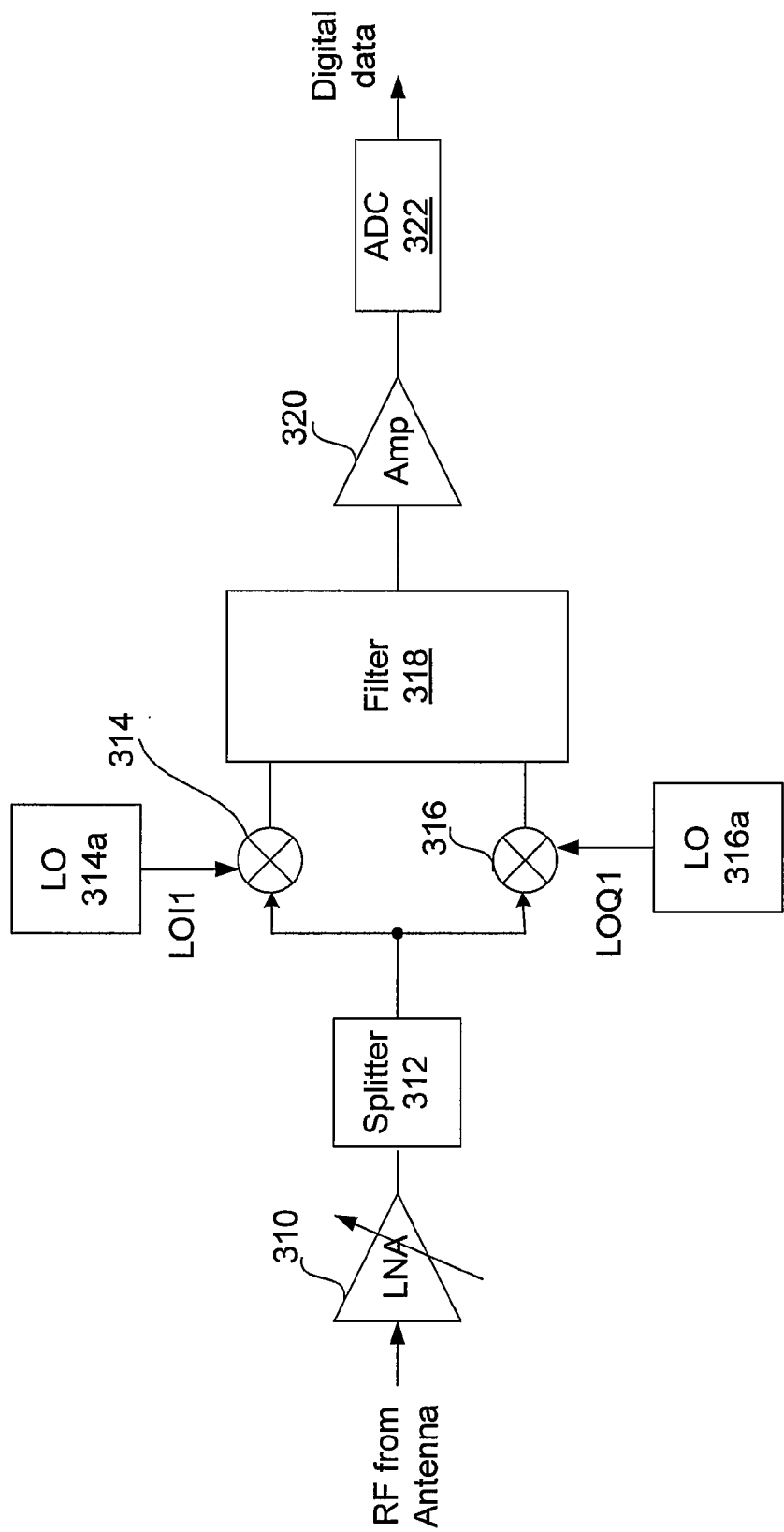
FIG. 3 is a block diagram illustrating an exemplary RF receiver front end (RFE), in accordance with an embodiment of the invention.

FIG. 3 is a block diagram illustrating an exemplary RF receiver front end (RFE), in accordance with an embodiment of the invention. Referring to FIG. 3, there is shown a low noise amplifier (LNA) 310, a power splitter 312, mixers 314 and 316, local oscillators 314a and 316a, a filter block 318, amplifier block 320, and analog to digital converter (ADC) block 322. The LNA 310 may comprise suitable logic, circuitry, and/or code that may be operable to amplify input signals and output the amplified signals. The LNA 310 may be utilized in instances where the signal to noise ratio (SNR) may be relatively low, such as, for example, RF signals received by the antenna 224. The LNA 310 may be similar, for example, to the LNA 222. The gain of the LNA 310 may be controlled by a processor, such as, for example, a baseband processor 104 or the processor 106. In this regard, the gain of the LNA 310 may be controlled externally and/or internally.

The power splitter 312 may comprise suitable circuitry that may enable communication of the amplified RF signal from the LNA 310 to the mixers 314 and 316. The power splitter 312 may, for example, divide the amplified RF signal substantially equally between the mixers 314 and 316 while minimizing distortion to the signals communicated to the mixers 314 and 316.

The mixers 314 and 316 may comprise suitable logic and/or circuitry that may be operable to have as inputs two signals, and generate one or more output signals. The input signals may be, for example, an RF signal and a local oscillator signal. The generated output signal may comprise a difference of the frequencies of the two input signals and/or a sum of the frequencies of the two input signals. The mixers 314 and 316 in a receiver path may down-convert the RF signal to IF signal.

The local oscillators 314a and 316a may comprise suitable logic and/or circuitry that may be operable to output a signal comprising one or more frequencies for use by the mixers 314 and/or 316. The local oscillators 314a and 316a may be controlled, for example, by the processor 106 and/or the baseband processor 104 to change frequencies in the output signals LOI1 and LOQ1. The output signals LOI1 and LOQ1 may then be used by the mixers 314 and 316 to down-convert the input signals to IF signals, where the frequency of the IF signals may vary as the local oscillator signals LOI1 and LOQ1 varies.

The filter 318 may comprise suitable logic, circuitry, and/or code that may be operable to selectively pass signals within a certain bandwidth while attenuating signals outside that bandwidth. Accordingly, the filter 318 may be a low pass filter or a bandpass filter. The filter 318 may further comprise an amplifier circuit that may be utilized to amplify the filtered signal by adjusting a gain of the input signal. The gain and/or filtering characteristics of the filter 318 may be controlled by a processor, such as, for example, the baseband processor 104 or the processor 106. In this regard, the gain and/or filtering characteristics of the filter 318 may be controlled externally and/or internally.

The amplifier block 320 may comprise suitable logic, circuitry, and/or code that may be operable to amplify a gain of the input signals and generate resulting output amplified signals. The gain of the amplifier block 320 may be controlled by a processor, such as, for example, a baseband processor 104 or the processor 106. In this regard, the gain of the amplifier block 320 may be controlled externally and/or internally.

The analog to digital converter (ADC) block 322 may comprise suitable logic, circuitry, and/or code that may be operable to convert analog signals to corresponding digital values, where the digital values may be samples of the analog signals.

In operation, RF signals, which may have a carrier frequency $f_{RF}$, may be received by the antenna 224 and communicated to the LNA 310, where the RF signals may be amplified by the LNA 310. The amplified RF signals may be communicated by the power splitter 312 to the mixers 314 and 316. The mixers 314 and 316 may mix the amplified RF signal with local oscillator signals LOI1 and LOQ1, respectively. The outputs of the mixers 314 and 316 may be IF in-phase (I) and quadrature (Q) signals, respectively, and these signals may be at an intermediate frequency.

Figure 4:
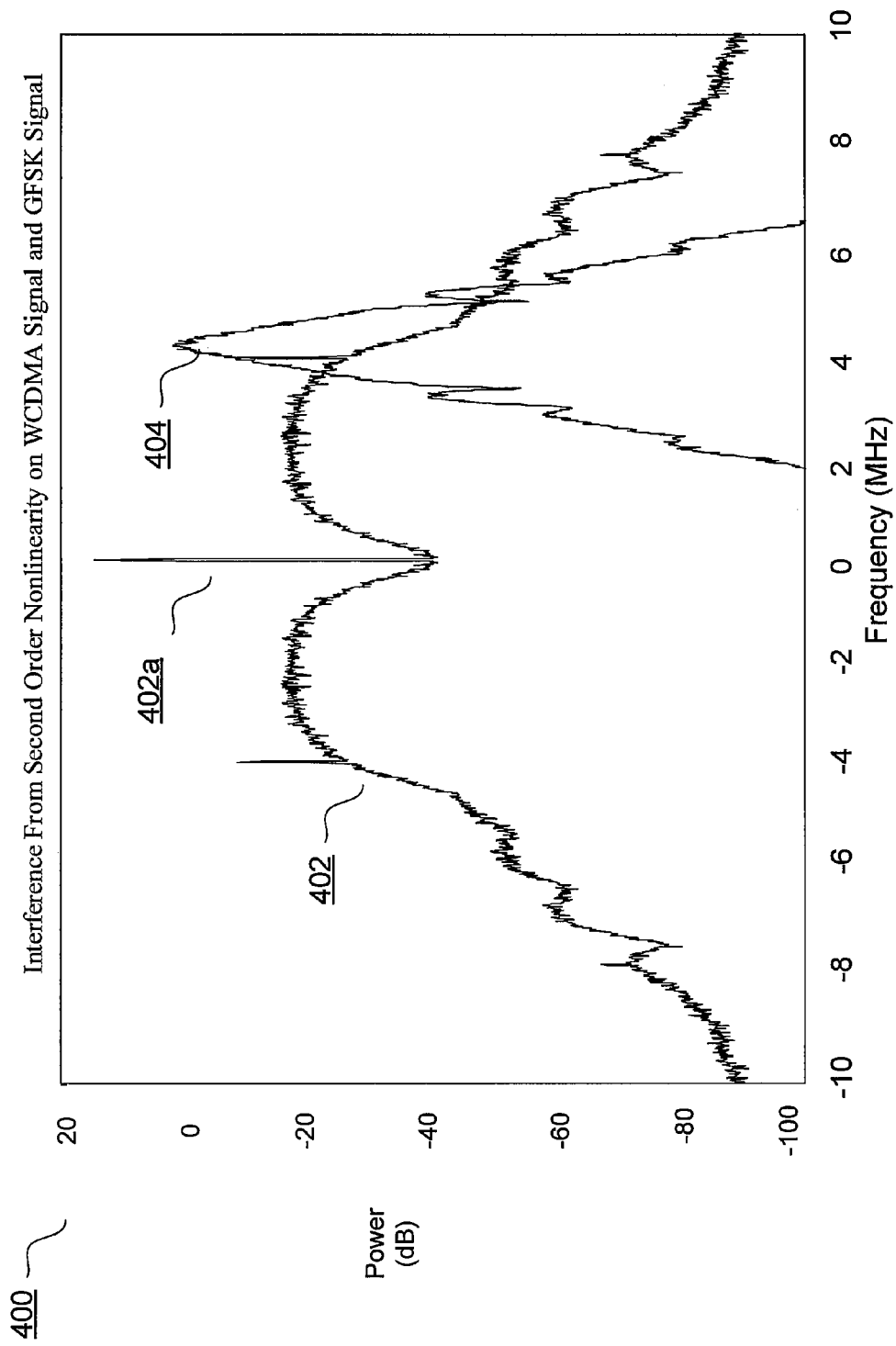
FIG. 4 is a graph illustrating non-constant envelope second order distortion signals interfering with desired signals.
Figure 5:
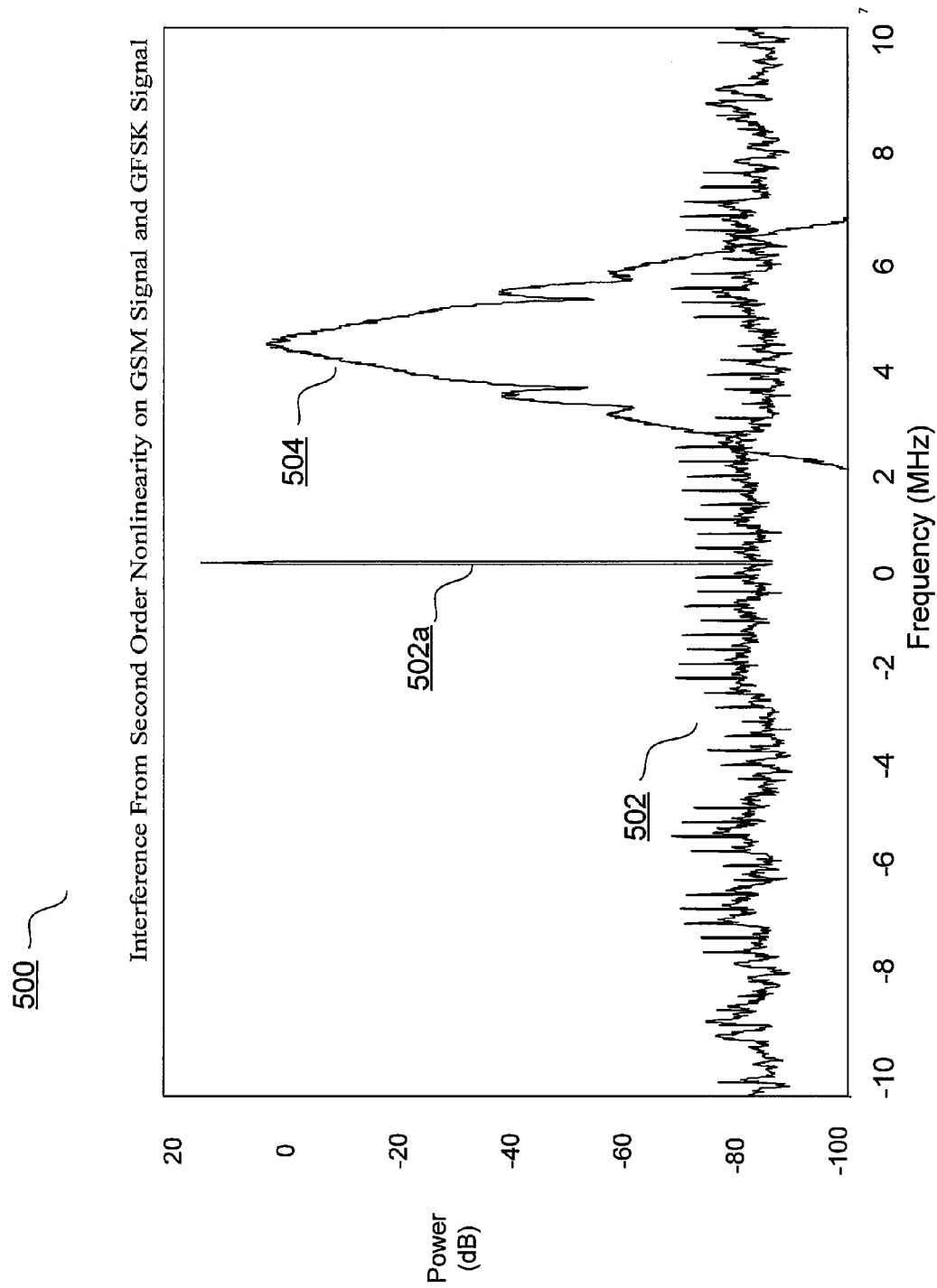
FIG. 5 is a graph illustrating constant envelope second order distortion signals interfering with desired signals.

In an embodiment of the invention, the intermediate signals may be, for example, a low intermediate frequency as illustrated with respect to FIGS. 4 and 5. Various embodiments of the invention may first down-convert the RF signal to a higher frequency intermediate frequency signal, which may then be further down-converted to low intermediate frequency signal. For exemplary purposes, the output of the mixers 314 and 316 will be referred to as LIF signals, regardless of the process that may have been used to achieve the output of the mixers 314 and 316.

The LIF signals may be interfered with or blocked by second order distortion signals. Accordingly, frequency of the LIF signals may be adjusted at the mixers 314 and 316 to move the desired LIF signals to a weaker portion of the second order distortion signal frequency spectrum.

The LIF signals output by the mixers 314 and 316 may be filtered by the filter 318. The filter 318 may attenuate frequencies outside the desired bandwidth, while minimizing attenuation of frequencies within the desired bandwidth. The filter 318 and/or the amplifier 320 may also amplify the LIF signals. The amplified LIF signals may then be converted to digital signals by the ADC 322. The digital signals may be communicated to, for example, the baseband processor 104 to be further processed.

FIG. 4 is a graph illustrating non-constant envelope second order distortion signals interfering with desired signals. Referring to FIG. 4, there is shown a graph 400 where signal strength is plotted with respect to signal frequency. In the graph 400, there is shown a signal 402 that represents the undesired second order interference signal received from a WCDMA transmitter. There is also shown a signal 404 that represents a desired signal that may have been down-converted to LIF signal, where the center frequency for the LIF signal may be, for example, 4 MHz.

The receiver that receives the desired signal 404 and the second order interference signal 402 may be, for example, the Bluetooth receiver 220. The WCDMA transmitter that is responsible for the second order interference signal 402 may be, for example, the cellular transmitter 210.

A center frequency of the desired Bluetooth LIF signal 404 may be adjusted to alleviate interference by the second order interference signal 402. For example, as shown in FIG. 4, the second order interference signal 402 may have a relative power of −20 dB at 2 MHz and the second order interference signal 402 may have a relative power of −80 dB at 8 MHz. Accordingly, shifting the frequency of the desired Bluetooth LIF signal 404 from a center frequency of 2 MHz to 8 MHz may reduce the interfering signals by 60 dB.

The amount frequency shift of the desired Bluetooth LIF signal 404 may be dependent on various operating conditions and/or design constraints. The design constraint may be, for example, the amount of frequency shift allowed by the Bluetooth receiver 220. Operating conditions may comprise, for example, relative signal strengths of the desired Bluetooth LIF signal 404 and the second order interference signal 402. The larger the signal to noise ratio of the desired Bluetooth LIF signal 404 with respect to the second order interference signal 402, the less the center frequency of the desired Bluetooth LIF signal 404 may have to be shifted.

Additionally, although not shown in FIG. 4, frequency shift of the desired Bluetooth LIF signal 404 toward DC may provide better noise reduction than frequency shift toward higher frequencies. However, there may be a substantial DC component 402a in the second order interference signal 402. Accordingly, care may be needed in determining the direction and amount of frequency shift. Determination of frequency shift may be made using, for example, simulated data and/or gathered data regarding second order interference signals by various transmission/modulation technologies. Additionally, signal integrity may be dynamically determined during operation to optimize the center frequency of the desired Bluetooth LIF signal 404.

For illustrative purposes, the cellular transmitter 210 may be collocated with the Bluetooth receiver 220. However, the cellular transmitter 210 need not be collocated with the Bluetooth receiver 220. Additionally, while the cellular transmitter 210 and the Bluetooth receiver 220 are used for illustrative purposes, various embodiments of the invention may be used with different types receivers alleviating interference from various transmission systems. For example, one type of receiver may be related to navigation satellite system (NSS), such as, for example, a global positioning system receiver.

FIG. 5 is a graph illustrating constant envelope second order distortion signals interfering with desired signals. Referring to FIG. 5, there is shown a graph 500 where signal strength is plotted with respect to signal frequency. In the graph 500, there is shown a signal 502 that represents the undesired second order interference signal received from a GSM transmitter. There is also shown a signal 504 that represents a desired signal that may have been down-converted to LIF signal, where the center frequency for the LIF signal may be, for example, 4 MHz.

The receiver that receives the desired signal 504 and the second order interference signal 502 may be, for example, the Bluetooth receiver 220. The GSM transmitter that is responsible for the second order interference signal 502 may be, for example, the cellular transmitter 210.

A center frequency of the desired Bluetooth LIF signal 504 may be adjusted to alleviate interference by the second order interference signal 502. For example, as shown in FIG. 5, the second order interference signal 502 may have a large DC power component 502*a*, and a relatively constant power of −80 dB up to 10 MHz. Accordingly, shifting the frequency of the desired Bluetooth LIF signal 504 from may not have much effect as long as the Bluetooth LIF signal 504 does not include DC. Accordingly, the desired Bluetooth LIF signal 504 may need to be shifted if the DC component 502*a* of the second order interference signal 502 acts as a blocker for a portion of the desired Bluetooth LIF signal 504.

The amount frequency shift of the desired Bluetooth LIF signal 404 may be dependent on various operating conditions and/or design constraints. An exemplary design constraint may comprise the amount of frequency shift allowed by the Bluetooth receiver 220. Operating conditions may comprise, for example, relative signal strengths of the desired Bluetooth LIF signal 504 and the DC component 502*a* of the second order interference signal 502.

Determination of frequency shift may be made using, for example, simulated data and/or gathered data regarding second order interference signals by various transmission/modulation technologies. Additionally, signal integrity may be dynamically determined during operation to optimize the center frequency of the desired Bluetooth LIF signal 504.

For illustrative purposes, the cellular transmitter 210 may be collocated with the Bluetooth receiver 220. However, the cellular transmitter 210 need not be collocated with the Bluetooth receiver 220. Additionally, while the cellular transmitter 210 and the Bluetooth receiver 220 are used for illustrative purposes, various embodiments of the invention may be used with different types receivers alleviating interference from various transmission systems.

Figure 6:
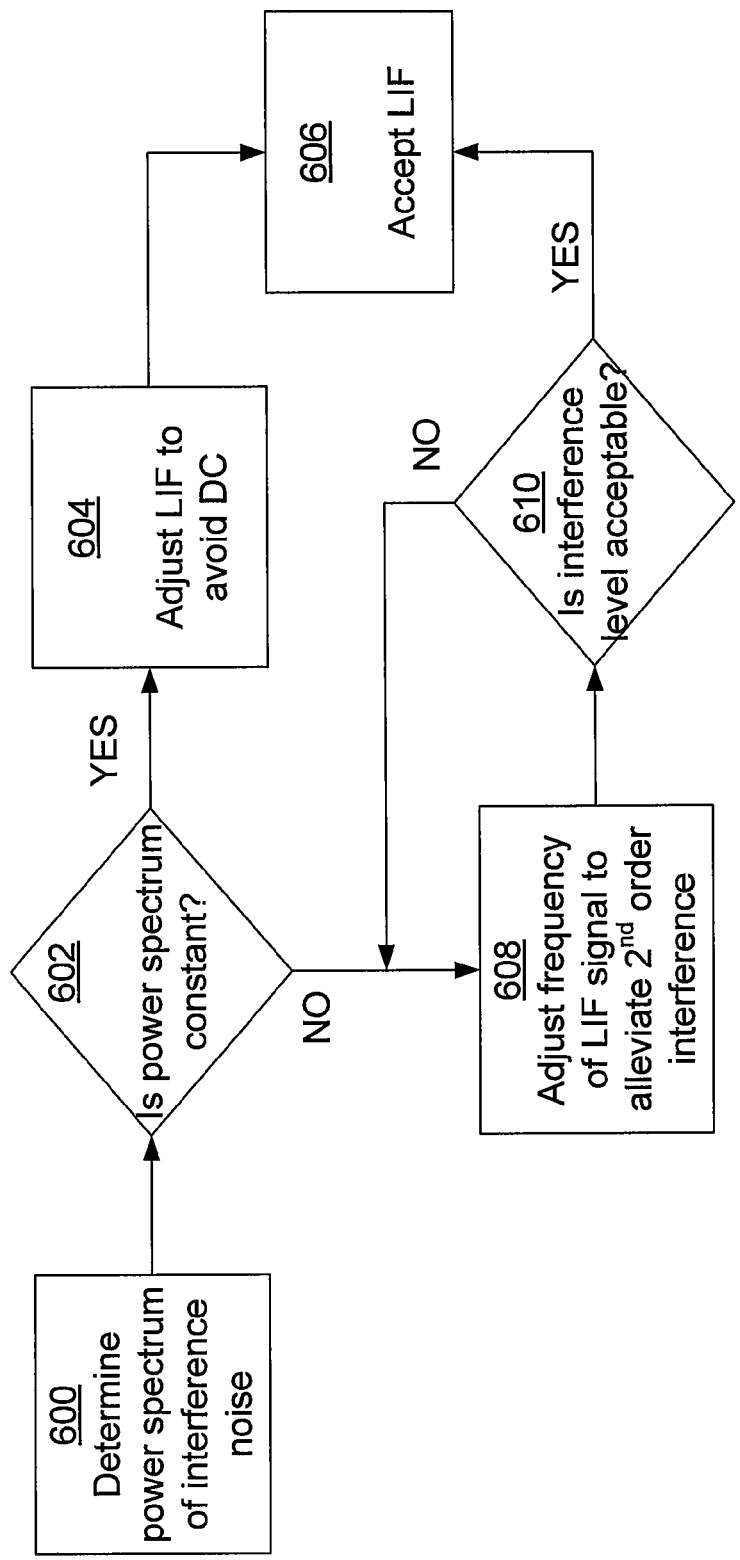
FIG. 6 is a flow diagram illustrating exemplary steps for optimal frequency planning for low intermediate frequency signals, in accordance with an embodiment of the invention.

FIG. 6 is a flow diagram illustrating exemplary steps for optimal frequency planning for low intermediate frequency signals. Referring to FIG. 6, there are shown steps 600 to 608. In step 600, a determination may be made of the interference signal power spectrum. In instances where the interfering signal source is known, then the type of power spectrum may also be known. For example, in instances where a collocated transmitter transmits WCDMA signals, then there may be a simulated second order interference signal strength spectrum for WCDMA signals. Similarly, in instances where a collocated transmitter transmits GSM signals, then there may be a simulated second order interference signal strength spectrum for the GSM signals. In instances where the interfering signal source is not known, then a default power spectrum, such as for the WCDMA signals may be used initially.

In step 602, a determination may be made as to whether the power spectrum may be constant in the LIF frequency spectrum. The determination may be made using, for example, power measurements at various frequency ranges. The specific method for determining whether a LIF frequency spectrum has a constant power level may be design dependent.

In instances where the LIF frequency spectrum has a constant power level, the next step may be step 604. Otherwise, the next step may be step 608. In step 604, the center frequency for LIF may be adjusted, as needed, to avoid, for example, the DC component 502*a* of the second order interference signal 502. In step 606, the center frequency of the LIF may be kept at the desired frequency.

In step 608, the center frequency of the desired LIF signal may be adjusted accordingly to a determined power spectrum for the interfering signal. For example, in instances where the interfering signal is WCDMA signal, the center frequency may be shifted to, for example, 8 MHz. In step 610, a determination may be made as to whether the interference may be acceptable. The determination may be made, for example, by calculating a bit error rate for the demodulated signals. The specific method for determining whether the interference level is acceptable may be design dependent.

In instances where the interference level is acceptable, the next step may be step 606. Otherwise, the next step may be step 608 where the center frequency for the LIF signal may be further adjusted.

Various exemplary embodiments of the invention may comprise a receiver that enables down-conversion of RF signal to low IF signal. For example, the Bluetooth receiver 220 may down-convert Bluetooth RF signals received via the antenna 224 to Bluetooth low IF signals. However, second order interference signals may interfere with the Bluetooth low IF signals. The second order interference signals may be due to transmitted signals from a nearby transmitter such as, for example, the cellular transmitter 210.

A processor, such as, for example, the processor 106 and/or the baseband processor 104, may determine a center frequency for the low IF signal to reduce interference by a second order interference signal. The processor 106 and/or the baseband processor 104 may then control, for example, the local oscillators 314*a* and 316*a* to adjust the frequency of the local oscillator signals LOI1 and LOQ1 generated by the local oscillators 314*a* and 316*a*, respectively. The mixers 314 and 316 may output low IF signals whose center frequency may be adjusted to the determined center frequency.

The center frequency for the low IF signals may be determined based upon a type of modulation envelope of the second order interference signal. For example, the power spectrum of the modulation envelope for the second order interference signal from a transmitted WCDMA signal may be non-constant, as described with respect to FIG. 4. The power spectrum of the modulation envelope for the second order interference signal from a GSM signal may be constant, as shown with respect to FIG. 5.

The modulation envelope for different types of wireless systems may be determined via simulation, for example.

Accordingly, if the source of the second order interference is known, for example, where it is a collocated transmitter, the appropriate power spectrum may be used to determine a new center frequency for the low IF signal. The power spectrum may be stored in memory 108, for example. Various embodiments of the invention may enable determining a signal to ratio (SNR) for the low IF signal. The SNR may enable the wireless system 100 to determine whether the second order interference may be at an acceptable level. Similarly, a bit error rate (BER) may be measured for the information from the low IF signal. The BER may also enable the wireless system 100 to determine whether the second order interference may be at an acceptable level. Therefore, the center frequency of the low IF signal may be iteratively adjusted to select an optimized center frequency. Accordingly, the second order interference may be determined dynamically to adjust the center frequency of the low IF signals.

The acceptable levels may also depend on operating conditions. Specification for acceptable levels for SNR and BER may be design dependent. Accordingly, the acceptable levels may be stored in memory 108 and retrieved as needed, or the acceptable levels may be calculated dynamically.

While the center frequency may generally be adjusted higher, as shown with respect to FIG. 4, in some cases, the center frequency may be adjusted to a lower frequency. In these cases, adjustment of the frequency may be done in a manner such that the DC component of the second order interference signal may not block a significant portion of the low IF signal.

Another embodiment of the invention may provide a machine-readable storage, having stored thereon, a computer program having at least one code section executable by a machine, thereby causing the machine to perform the steps as described herein for optimal frequency planning for an integrated communication system with multiple receivers.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus operable to carry out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for processing signals, the method comprising:
    down-converting RF signal to low IF signal;
    determining a center frequency for said low IF signal that results in a reduction of interference by a second order interference signal; and
    adjusting a center frequency of a low IF signal to said determined center frequency.

2. The method according to claim 1, comprising determining said center frequency of said low IF signal based on a type of modulation envelope for said second order interference signal.

3. The method according to claim 1, comprising iteratively adjusting said center frequency of said low intermediate frequency signal.

4. The method according to claim 3, wherein said optimizing adjustment of said center frequency of said low IF signal is based on signal to noise ratio of said low IF signal.

5. The method according to claim 3, wherein said optimizing adjustment of said center frequency of said low IF signal is based on bit error rate of said low IF signal.

6. The method according to claim 1, comprising shifting said center frequency of said low IF signal for said reduction in interference due to a DC component of said second order interference signal.

7. The method according to claim 1, comprising dynamically determining an amount of interference to said low IF signal by said second order interference signal.

8. A machine-readable storage having stored thereon, a computer program having at least one code section for processing signals, the at least one code section being executable by a machine for causing the machine to perform steps comprising:
    down-converting RF signal to low IF signal;
    determining a center frequency for said low IF signal that results in a reduction of interference by a second order interference signal; and
    adjusting a center frequency of a low IF signal to said determined center frequency.

9. The machine-readable storage according to claim 8, wherein the at lest one code section comprises code for determining said center frequency of said low IF signal based on a type of modulation envelope for said second order interference signal.

10. The machine-readable storage according to claim 8, wherein the at least one code section comprises code for iteratively adjusting said center frequency of said low intermediate frequency signal.

11. The machine-readable storage according to claim 10, wherein said optimizing adjustment of said center frequency of said low IF signal is based on signal to noise ratio of said low IF signal.

12. The machine-readable storage according to claim 10, wherein said optimizing adjustment of said center frequency of said low IF signal is based on bit error rate of said low IF signal.

13. The machine-readable storage according to claim 10, wherein said optimizing adjustment of said center frequency of said low IF signal comprises shifting said center frequency of said low IF signal to reduce interference to said low IF signal by a DC component of said second order interference signal.

14. The machine-readable storage according to claim 8, wherein the at least one code section comprises code for dynamically determining an amount of interference to said low IF signal by said second order interference signal.

15. A system for processing signals, the system comprising:
one or more circuits that enable down-conversion of RF signal to low IF signal;
said one or more circuits enable determination of a center frequency for said low IF signal that results in a reduction of interference by a second order interference signal; and
said one or more circuits enable adjusting a center frequency of a low IF signal to said determined center frequency.

16. The system according to claim 15, wherein said one or more circuits enable determination of said center frequency of said low IF signal based on a type of modulation envelope for said second order interference signal.

17. The system according to claim 15, wherein said one or more circuits enable iterative adjustment of said center frequency of said low intermediate frequency signal.

18. The system according to claim 17, wherein said optimization of adjustment of said center frequency of said low IF signal is based on signal to noise ratio of said low IF signal.

19. The system according to claim 17, wherein said optimization of adjustment of said center frequency of said low IF signal is based on bit error rate of said low IF signal.

20. The system according to claim 15, wherein said one or more circuits enable shifting of said center frequency of said low IF signal for said reduction in interference due to a DC component of said second order interference signal.

21. The system according to claim 15, wherein said one or more circuits enable dynamic determination of an amount of interference to said low IF signal by said second order interfering signal.

* * * * *